United States Patent
Fernández-Borja et al.

(10) Patent No.: US 10,402,873 B2
(45) Date of Patent: Sep. 3, 2019

(54) SYSTEM FOR THE ACQUISITION OF ELECTRONIC SERVICES AND/OR PRODUCTS USING ELECTRONIC MESSAGES

(71) Applicants: Mauricio Raúl Fernández-Borja, Del. Miguel Hidalgo (MX); Iván Mauricio Ramírez-González, Del. Miguel Hidalgo (MX)

(72) Inventors: Mauricio Raúl Fernández-Borja, Del. Miguel Hidalgo (MX); Iván Mauricio Ramírez-González, Del. Miguel Hidalgo (MX)

(73) Assignee: Mauricio Raul Fernandez-Borja, Del. Miguel Hidalgo, Ciudad de México ( * ) Notice: Subject to any disclaimer, the term of this patent is extended or adjusted under 35 U.S.C. 154(b) by 210 days.

(21) Appl. No.: 15/544,388

(22) PCT Filed: Jan. 21, 2015

(86) PCT No.: PCT/IB2015/000055
§ 371 (c)(1),
(2) Date: Jul. 18, 2017

(87) PCT Pub. No.: WO2016/116773
PCT Pub. Date: Jul. 28, 2016

(65) Prior Publication Data
US 2018/0268449 A1    Sep. 20, 2018

(51) Int. Cl.
*G06Q 20/20* (2012.01)
*G06Q 30/06* (2012.01)
(Continued)

(52) U.S. Cl.
CPC ......... *G06Q 30/0601* (2013.01); *G06Q 20/12* (2013.01); *H04L 51/046* (2013.01);
(Continued)

(58) Field of Classification Search
CPC ........... G06Q 2220/10; G06Q 2220/18; G06Q 2220/14; G06Q 20/202
See application file for complete search history.

(56) References Cited

FOREIGN PATENT DOCUMENTS

| ES | 2381293 | 5/2012 |
|---|---|---|
| ES | 2392986 | 12/2012 |

(Continued)

OTHER PUBLICATIONS

International Search Report dated Oct. 15, 2015, in corresponding PCT Application No. PCT/IB2015/000055.

*Primary Examiner* — A. Hunter Wilder
(74) *Attorney, Agent, or Firm* — Buchanan Ingersoll & Rooney PC

(57) ABSTRACT

The invention relates to a system for the acquisition of electronic services and/or products using electronic messages, comprising: at least a plurality of devices for receiving/sending instructions, wherein each of the devices for receiving/sending instructions is for generating an instruction of the selection carried out by an initial user of said system and sending same to an instruction-processing server for the processing thereof; an instruction-processing server for receiving and processing the selection instruction of the initial user in order to generate an assigning instruction and send same to an assigning server; an assigning server for receiving and processing the assigning instruction of the instruction-processing server, generating a sending instruction that is dealt with by the electronic message-sending device; a plurality of the final user devices, wherein each of the devices is managed by a final user, which receives an electronic message from the electronic message-sending device; and a plurality of servers providing products and/or services, into which the final user inputs information contained in the electronic message received in the final user device via an access portal available in each of said servers (Continued)

providing products and/or services, in order to be able to have access to the requested electronic service and/or product.

11 Claims, 1 Drawing Sheet

(51) Int. Cl.
*G06Q 20/12* (2012.01)
*H04L 12/58* (2006.01)

(52) U.S. Cl.
CPC ....... *G06Q 20/202* (2013.01); *G06Q 2220/10* (2013.01); *G06Q 2220/14* (2013.01); *G06Q 2220/18* (2013.01)

(56) References Cited

FOREIGN PATENT DOCUMENTS

| | | |
|---|---|---|
| ES | 2430738 | 11/2013 |
| ES | 2456815 | 4/2014 |

SYSTEM FOR THE ACQUISITION OF ELECTRONIC SERVICES AND/OR PRODUCTS USING ELECTRONIC MESSAGES

CROSS-REFERENCE TO RELATED APPLICATIONS

This application is a U.S. National Stage Application pursuant to 35 U.S.C. § 371 of International Patent Application PCT/IB2015/000055, filed on Jan. 21, 2015, and published as WO 2016/116773 on Jul. 28, 2016, which is incorporated herein by reference in its entirety for all purposes.

FIELD OF THE INVENTION

The present invention relates to those systems which allow the acquisition of electronic goods and/or services using means of communication employing electronic transmission signals, and more particularly relates to a system for the acquisition of electronic products and/or services using electronic messages, which allows access to diverse services and/or products, using communication platforms compatible with electronic devices, such as cell phones, tablets and/or computers.

BACKGROUND OF THE INVENTION

The technological advancement in the last two decades, have allowed for an evolution in the acquisition of goods and/or services, both physical and digital which has facilitated its purchase and delivery, regardless of the geographical location of the buyer user. For example, currently, the acquisition of various electronic goods such as music, videos, films, series and/or television programs, etc., can be done through the purchase of prepaid cards, which are acquired through a point of sale terminal of some establishment, where said prepaid card has a code that allows it the user to access the electronic good in the portal of the corresponding company.

An example of the above can be found in European Patent Application No. EP 1 519 332 A1, which discloses a method and system for providing digital content to consumers using a prepaid digital content medium. The method includes receiving unique identification information associated with the prepaid digital content medium (PDCM) from a PDCM distributor. Once a buyer has acquired a PDCM, the unique identification information associated with said PDCM is sent to an authentication service provider and the PDCM is activated based on said identification information. The authentication service provider sends an activation confirmation of the PDCM to the digital content provider in response to a confirmation request from said digital content provider, wherein the digital content provider sends a confirmation request in response to a request of digital content by a consumer who has acquired the PDCM.

The system above described gives the buyer the possibility to dispose and use the electronic good immediately after the transaction with the digital content provider is completed. In one of its modalities, said system uses prepaid cards that the user acquires in a physical establishment, which constitutes a limitation for the sales of the establishment, since the establishment has a "limited" number of cards to sell and in the case in which they are terminated, the user could not acquire the electronic good in said establishment. Therefore, the establishment must keep in physical stock, the prepaid cards of the digital content provider for sale to the public.

In the state of the art, we can find, in addition to the above prepaid cards, the use of printed codes in a purchase ticket, (known as "pin on receipt"), which is another way in which a user can purchase a code to access digital content from a provider. An example of this is described in U.S. Pat. No. 7,613,237, which comprises a system and method for providing a personal identification number (PIN) printed on a receipt by a customer terminal. The method includes storing at the client terminal, receipt formats that are sent from a server for various prepaid services from a plurality of prepaid service providers. The method further includes receiving, at the client terminal, a request for a PIN associated with one or more of the various prepaid services. The requested PIN and other information associated with one or more of the various prepaid services is displayed or printed according to one or more of the receipt formats for its reception and dispensing by the customer terminal.

The method above described eliminates the use of prepaid cards, which entails that the trade in question is no longer limited to the physical stock of said cards and has "unlimited" availability for the sale of codes to the user.

However, said method is limited to the user moving to the location where the point of sale terminal is located. In addition, there is a risk that the user may damage or misplace the receipt where the PIN is printed, and in case this happens, it is not possible for the user to receive the PIN printed again at the establishment where he acquired it. Another disadvantage of the above described method is that there is a need for a printer, whether thermal, dot matrix, inkjet or laser, whereby the ability to generate sales in the establishments is limited to having a device that allows printing the access code and instructions for use.

The technological advance and the decrease in the costs of physical electronic products such as cell phones and tablets, have allowed its massification in our society, which means that most of the people currently have an equipment and assigned cell phone number. That is why many companies and organizations since a few years began to develop digital systems that allow the sending of notifications to the user cell phone number, which may contain information on an action or a code.

Particularly, some banks have the service of sending the personal identification number (PIN) to their users via SMS type electronic messages, which prevents the user from having to physically move to the branch of the bank to obtain the PIN. With this, the user can promptly have his PIN for activation of a credit or debit card. However, this system is limited to sending these numbers for specific use in the services and products offered by the issuing bank.

Accordingly, in the state of the art, to date there is no efficient system that allows the acquisition of electronic products and/or services by means of a code that is sent to a user device through an electronic message, which allows the user to have immediate access to the product and/or service, when acquired through the server portal of the provider.

OBJECTS OF THE INVENTION

It is an object of the present invention to provide a system for acquiring electronic products and/or services using electronic messages, which allows access to various electronic products and/or services, using communication platforms compatible with electronic devices, such as cell phones, tablets and/or computers.

It is a further object of the present invention to provide a system for acquiring electronic products and/or services using electronic messages, enabling payment to be made and access to electronic products and/or services remotely.

It is another object of the present invention to provide a system for acquiring electronic products and/or services using electronic messages, which allows for the elimination of expenses associated with the transportation, storage, custody and display of electronic products.

It is a further object of the present invention to provide a system for acquiring electronic products and/or services using electronic messages, which eliminates the need for printing devices for the delivery of the electronic product and/or service, thereby generating significant savings on paper, thus contributing to ecology.

A further object of the present invention is to provide a system for acquiring electronic products and/or services using electronic messages, which allows the obtaining and delivery of electronic products and/or services to a plurality of users, Practical and straightforward way.

It is a further object of the present invention to provide a system for acquiring electronic products and/or services using electronic messages, which allows the immediate sending of a code (key) to a user device, whereby the user may dispose and use the product and/or service acquired immediately through the server portal of the provider.

SUMMARY OF THE INVENTION

The present invention relates to a system for the acquisition of electronic products and/or services using electronic messages comprising at least a plurality of instruction receiving/sending devices, wherein each of the instruction receiving/sending devices is responsible for generating and sending an selection instruction made by an initial user of the present system for the acquisition of products and/or services to an instruction processing server for processing; an instruction processing server, which is interconnected to each of the instruction receiving/sending devices conforming a plurality of instruction receiving/sending devices, which is responsible for receiving and processing the selection instruction of initial user to generate and send an assigning instruction to an assigning server; an assigning server which is interconnected to the instruction processing server and to an electronic message sending device, which is responsible for receiving and processing the assigning instruction of the instruction processing server, generating a sending instruction being serviced by the electronic message sending device; a plurality of end user devices, wherein each of the end user devices of the plurality of end user devices is handled by an end user, which receives an electronic message from the electronic message sending device; and a plurality of servers providing products and/or services, to which the end user inputs information contained in the electronic message previously received in the end user device, via an access portal available on each of said servers providing products and/or services, in order to can have access to the requested electronic product and/or service.

Among the electronic products and/or services that can be acquired through the system of the present invention, are among others: diverse digital multimedia content (photos, videos, music, books), computer programs, video games, electronic air time for cell phones, balance statement for purchase in electronic stores, etc.

BRIEF DESCRIPTION OF THE DRAWINGS

Bellow, in the following figures it can be seen, the configuration and elements comprising a system for acquiring electronic products and/or services using electronic messages of the present invention, wherein.

DETAILED DESCRIPTION OF THE INVENTION

Figure 1:
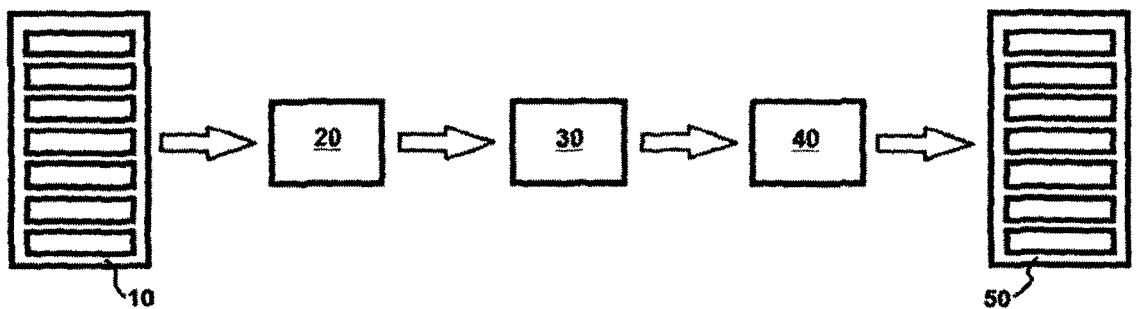
FIG. 1 is a block diagram, showing the interrelation of the various elements that comprise a preferred modality of the system for acquisition of electronic products and/or services using electronic messages.
Figure 2:
FIG. 2 is a block diagram, showing the interrelation of an initial/final user with a server providing products and/or services of the plurality of servers providing products and/or services.

Referring to the accompanying FIG. 1 and FIG. 2, there is shown the interrelation of the various elements conforming the system 100 for the acquisition of electronic products and/or services using the electronic messages of the present invention, wherein said system 100 comprises at least a plurality of instruction receiving/sending devices 10, wherein each of the instruction receiving/sending devices is responsible for generating and sending an selection instruction made by an initial user of the present system 100 to an instruction processing server 20 for processing; an instruction processing server 20, which is interconnected to each of the instruction receiving/sending devices conforming the plurality of instruction receiving/sending devices 10, which is responsible for receiving and processing the selection instruction of the initial user for generating and sending an assigning instruction to an assigning server 30; an assigning server 30 which is interconnected to the instruction processing server 20 and to an electronic message sending device 40, which is responsible for receiving and processing the assigning instruction of the processing server 20, generating a sending instruction being serviced by the electronic message sending device 40; a plurality of end user devices 50, wherein each of the end user devices of the plurality of end user devices 50 is handled by an end user, which receives an electronic message from the electronic message sending device 40; and a plurality of servers providing products and/or services 60, to which the end user inputs information contained in the electronic message received in the end user device via an access portal 65 available on each of said servers providing products and/or services, in order to can have access to the requested electronic product and/or service.

The plurality of instruction receiving/sending devices 10 is responsible for generating a selection instruction of the required product and/or service by an initial user of the present system for acquisition of electronic products and/or services 100. Said instruction depends on the type of electronic product and/or service that the initial user requires at that time, in addition to including such instruction, personal information of the end user that will obtain the desired electronic product and/or service, such as its cell phone number or e-mail address. It should be mentioned that among the electronic products and/or services that can be acquired through the system 100 of the present invention, are among others: diverse digital multimedia content (photos, videos, music, books), computer programs, video games, electronic air time for cell phones, balance statement for purchase in electronic stores, etc.

Each of the instruction receiving/sending devices conforming the plurality of instruction receiving/sending devices 10 comprises all those electronic components necessary for receiving, processing, generating and sending the selection instruction from an initial user of the present system 100, as well as all those electronic components necessary for its interconnection with the instruction processing server 20. Among the main components conforming each of said devices, are at least one source of power and/or battery; a processor; a ROM-type memory unit; a RAM-type memory unit; a network card; an input peripheral; and, an output peripheral. Examples of such instruction receiving/sending devices may be computers, cell phones, tablets, cash machines, point-of-sale terminals, among others.

As previously described, the instruction processing server 20 in which the information being sent by the initial user is processed is interconnected to the plurality of instruction receiving/sending devices 10 and to an assigning server 30. Among the main electronic components conforming said instruction processing server 20 are at least one source of power and/or battery; a processor; a ROM-type memory unit; a RAM-type memory unit; a network card; an input peripheral; and, an output peripheral.

The instruction processing server 20 is responsible for receiving and processing the selection instruction from at least one instruction receiving/sending device from the plurality of instruction receiving/sending devices 10. Once said selection instruction has been processed, said instruction processing server 20 generates an assigning instruction, which is sent to the assigning server 30.

The assigning server 30 is interconnected with the instruction processing server 20 and with the electronic message sending device 40, which is responsible for receiving the assigning instruction from the instruction processing server 20. Among the main electronic components conforming said assigning server 30 are at least one source of power and/or battery; a processor; a ROM-type memory unit; a RAM-type memory unit; a network card; an input peripheral; and, an output peripheral.

At the ROM-type memory of said assigning server 30 are stored in a first section, a plurality of active codes of the various electronic products and/or services offered in the present system 100 for the acquisition of electronic products and/or services that employs electronic messages. Also, in a second section of said ROM-type memory, a plurality of electronic message formats is stored, which depend on the offered electronic products and/or services and containing information on how to make use of the active codes of the first section of said ROM-type memory, which are associated with the acquired electronic products and/or services.

Once the assigning server 30 has processed the assigning instruction from the instruction processing server 20, it generates a sending instruction that is sent and serviced by the electronic message sending device 40.

The electronic message sending device 40 receives the sending instruction from the assigning server 30, processes it and generates an electronic message which is sent to an end user device of the plurality of end user devices 50, which corresponds to the device associated with the cell phone number or the e-mail address provided by the selector user when requesting the electronic product and/or service. The electronic message sent by said electronic message sending device 40 may be SMS, MMS, e-mail or by some electronic messaging program such as Whatsapp®.

In a preferred embodiment, the electronic message sending device 40 comprises a multi-port modem for mass sending of messages over the cellular network, wherein said messages may be SMS type or via some electronic messaging program such as Whatsapp®. In an alternative embodiment of the invention, said electronic message sending device 40 comprises a computer, configured for sending e-mail type electronic messages over the Internet.

The interconnections between the plurality of instruction receiving/sending devices 10 and the instruction processing server 20, between the instruction processing server 20 and the assigning server 30, and the assigning server 30 and the electronic messages sending device 40 is realized using networks widely known in the state of the art, such as LAN, WAN, VPN, etc. networks, whether wired or wireless. For this reason, it is not considered necessary to give more details on the specifications of the interconnection between said elements.

The devices conforming the plurality of end user devices 50 have all the components necessary for receiving and displaying the electronic message sent by the electronic message sending device 40. Among the main electronic components conforming such end user devices are at least one source of power and/or battery; a processor; a ROM-type memory unit; a RAM-type memory unit; a network card; an input peripheral; and, an output peripheral.

Likewise, each of the servers providing products and/or services of the plurality of servers providing products and/or services 60 has all the necessary electronic components so that the end user can access the information contained in the electronic message and can have the desired electronic product and/or service via an access portal 65 located within the server providing products and/or services. The end user accesses said access portal 65 using of wired and/or wireless networks widely known in the state of the art, such as LAN, WAN, VPN networks, the Internet being the preferred access network. Among the main electronic components conforming such servers providing products and/or services are at least one source of power and/or battery; a processor; a ROM-type memory unit; a RAM-type memory unit; a network card; an input peripheral; and, an output peripheral.

The present system 100 for the acquisition of electronic products and/or services using electronic messages operates as follows: an initial user of the present system 100 selects the desired electronic product and/or service in an instruction receiving/sending device of the plurality of instruction receiving/sending devices 10. Said instruction receiving/sending device is responsible for generating a selection instruction containing information about the electronic product and/or service desired by the initial user as well as personal information from an end user who will use the desired electronic product and/or service, such as its cell phone number and/or e-mail address. The selection instruction is sent to the instruction processing server 20 for processing.

The instruction processing server 20 receives and processes the selection instruction from the instruction receiving/sending device of the plurality of instruction receiving/sending devices 10, generating an assigning instruction that is sent to the assigning server 30. The assigning instruction contains information about the electronic product and/or service selected by the initial user, as well as personal information of the end user, such as its cell phone number or e-mail address.

The assigning server 30 receives the assigning instruction from the instruction processing server 20 and is responsible for processing it. Depending on the electronic product and/or service indicated by the initial user in said assigning instruction, the assigning server 30 is responsible for generating a sending instruction that is sent to the electronic message sending device 40. This instruction contains an active code obtained from the first section of its ROM-type memory and an electronic message format obtained from the second section of its ROM-type memory, which depend on the electronic product and/or service desired by the selector user.

The electronic message sending device 40 receives the instruction from the assigning server 30 and is responsible for processes it. Said electronic message sending device 40 generates an electronic message containing an active code and an electronic message format according to the electronic product and/or service required by the initial user. If the initial user provided a cell phone number of the end user, the electronic message will be SMS, MMS or via some electronic messaging program that requires the use of a cell phone number such as Whatsapp®. If the initial user provided an e-mail address of the end user, the electronic message will be an e-mail.

The electronic message is received by the end user in an end user device of the plurality of end user devices 50. Upon receiving and displaying said electronic message, the end user has instructions to make use of the active code present in said electronic message. In order to be able to dispose of the desired electronic product and/or service, the end user must access through a network (preferably the Internet) to an access portal 65 of a server providing products and/or services of the plurality of servers providing products and/or services 60, by means of an electronic device, which may be the end user device through which the electronic message or else, another electronic device was received. Among the electronic devices that the end user can use to access the access portal 65 is a cell phone, a tablet, a video console and/or a computer.

By accessing said access portal 65 of the server providing products and/or services of the plurality of servers providing products and/or services 60, the end user provides their active code to enjoy the selected electronic product and/or service.

While in the foregoing description, preferred and alternative embodiments of the present invention have been described and shown, it should be emphasized that numerous modifications are possible thereto, without departing from the true scope of the invention, such as modifying the type of electronic message sent to the end user device, the type of communication network used, the technical characteristics and capabilities of the different servers and the message sending device, etc. Therefore, the present invention should not be restricted except as required by the prior art and the appended claims.

The invention claimed is:

1. A system for the acquisition of electronic products or services using electronic messages, the system comprising:
    a plurality of instruction receiving/sending devices, wherein each of the instruction receiving/sending devices is responsible for generating and sending an selection instruction made by an initial user to an instruction processing server for processing, and wherein the selection instruction depends on a type of a desired electronic product or service that the initial user requires or requests at that time and contains personal information of an end user who will obtain the desired electronic product or service, comprising a cell phone number or an e-mail address;
    the instruction processing server, which is interconnected to each of the instruction receiving/sending devices conforming the plurality of instruction receiving/sending devices and to an assigning server, which is responsible for receiving and processing the selection instruction of the initial user for generating and sending an assigning instruction to the assigning server;
    the assigning server that is interconnected to the instruction processing server and to an electronic message sending device, which is responsible for receiving and processing the assigning instruction from the instruction processing server, generating a sending instruction being serviced by the electronic message sending device comprising at least one active code for the desired electronic product or service, wherein a plurality of active codes of the electronic products or services are stored by the assigning server;
    the electronic message sending device that is interconnected to the assigning server and to a plurality of end user devices, which is responsible for receiving and processing the sending instruction from the assigning server, generating an electronic message that is sent to an end user device of the plurality of end user devices comprising the at least one active code and an electronic message format according to the electronic product or service required or requested by the initial user, wherein the electronic message sending device generates and sends the electronic message to an end user device of the end user that corresponds to the device associated with the cell phone number or with the e-mail address provided by the initial user when requesting the electronic product or service;
    the plurality of end user devices, wherein each of the end user devices of the plurality of end user devices is handled by an end user, which receives the electronic message from the electronic message sending device; and,
    a plurality of servers providing products or services, to which the end user inputs information contained in the electronic message received in the end user device comprising at least the at least one active code via an access portal available on each of said plurality of servers providing products or services, in order to have access to the required or requested electronic product or service;
    wherein the type of electronic products or services that can be acquired comprise at least: diverse digital multimedia content, computer programs, video games, electronic air time for cell phones, and balance statements for purchases in electronic stores.

2. The system for the acquisition of products or services using electronic messages in accordance with claim 1, wherein each of the instruction receiving/sending devices conforming the plurality of instructions receiving/sending devices comprises electronic components for reception, processing, generation and sending of the selection instruction from the initial user, as well as electronic components for interconnection with the instruction processing server; wherein, among the components conforming each of said devices are at least one source of power or battery; a processor; a ROM-type memory unit; a RAM-type memory unit; a network card; an input peripheral; and, an output peripheral.

3. The system for the acquisition of products or services using electronic messages in accordance with claim 2, wherein the instruction receiving/sending devices conforming the plurality of instruction receiving/sending devices are selected between computers, cell phones, tablets, Cash machines or point of sale terminals.

4. The system for the acquisition of products or services using electronic messages in accordance with claim 1, wherein among electronic components conforming the instruction processing server there are at least one source of power or battery; a processor; a ROM-type memory unit; a RAM-type memory unit; a network card; an input peripheral; and an output peripheral.

5. The system for acquiring products or services using electronic messages in accordance with claim 1, wherein among components conforming the assigning server there are at least one source of power or battery; a processor; a ROM-type memory unit; a RAM-type memory unit; a network card; an input peripheral; and, an output peripheral.

6. The system for the acquisition of products or services using electronic messages in accordance with claim 5, wherein in the ROM-type memory of said assigning server are stored in a first section, the plurality of active codes of the various electronic products or services offered for the acquisition of electronic products or services using electronic messages; and in a second section of said ROM-type memory, a plurality of electronic message formats are stored which depend on the offered electronic products or services and containing information on how to make use of the active codes of the first section of said ROM-type memory, which are associated with the acquired electronic products or services.

7. The system for the acquisition of products or services using electronic messages in accordance with claim 1, wherein the electronic message sent by said electronic message sending device may be SMS, MMS, electronic mail or via some electronic messaging program such as Whatsapp®.

8. The system for the acquisition of products or services using electronic messages in accordance with claim 7, wherein the electronic message sending device comprises a multi-port modem for mass message sending over the cellular network, wherein said messages may be SMS type or via some electronic messaging program such as Whatsapp®.

9. The system for acquiring products or services using electronic messages in accordance with claim 7, wherein said electronic message sending device comprises a computer, configured for the sending of e-mail type electronic messages over the Internet.

10. The system for the acquisition of products or services using electronic messages in accordance with claim 1, wherein the devices conforming the plurality of end user devices have components for reception and display of the electronic message sent by the electronic message sending device; among the components conforming said end user devices there is at least one power source or battery; a processor; a ROM-type memory unit; a RAM-type memory unit; a network card; an input peripheral; and, an output peripheral.

11. The system for acquiring products or services using electronic messages according to claim 1, wherein each of the plurality of servers providing products or services of the plurality of servers providing products or services has electronic components so that the end user can access the information contained in the electronic message and can have the desired electronic product or service via the access portal located inside the server providing products or services; among electronic components conforming said servers providing products or services are at least one source of power or battery; a processor; a ROM-type memory unit; a RAM-type memory unit; a network card; an input peripheral; and, an output peripheral.

* * * * *